United States Patent [19]

Schaaf

[11] Patent Number: 5,470,466
[45] Date of Patent: Nov. 28, 1995

[54] METHOD AND APPARATUS FOR REMOVING FERROUS PARTICLES FROM COOLANT FLUID DURING MACHINING

[76] Inventor: William R. Schaaf, 210 Middle Brook Rd., Greer, S.C. 29651

[21] Appl. No.: 230,220

[22] Filed: Apr. 20, 1994

Related U.S. Application Data

[63] Continuation-in-part of Ser. No. 34,937, Mar. 17, 1993, abandoned.

[51] Int. Cl.$^6$ .............................. B01D 35/06; B03C 1/02
[52] U.S. Cl. .................. 210/222; 209/223.2; 209/228; 451/447; 451/453
[58] Field of Search ........................... 209/223.1, 223.2, 209/228; 210/222, 223, 695; 51/266, 267, 268, 270, 272; 451/28, 447, 453

[56] References Cited

U.S. PATENT DOCUMENTS 3,700,849 10/1972 Zuzelo ............................. 451/447 X
4,120,121 10/1978 Surman ............................. 451/453 X
5,043,063 8/1991 Latimer .................................. 210/222
5,066,390 11/1991 Rhodes et al. ...................... 210/222 X
5,188,239 2/1993 Stowe ................................. 210/222 X

FOREIGN PATENT DOCUMENTS 3307319 9/1984 Germany ............................ 209/223.2

Primary Examiner—William E. Terrell
Assistant Examiner—Tuan N. Nguyen
Attorney, Agent, or Firm—Ralph Bailey

[57] ABSTRACT

The method and apparatus of removing metallic particles of magnetic material from coolant fluid used in a machining operation includes placing an assembly including elongated magnets (A) in elongated covers (B) constructed of a non-magnetic plastic with sealing and reinforcing members preventing direct attachment of metallic particles to the magnet facilitating removal of the particles when the assembly is removed from the coolant fluid.

5 Claims, 3 Drawing Sheets

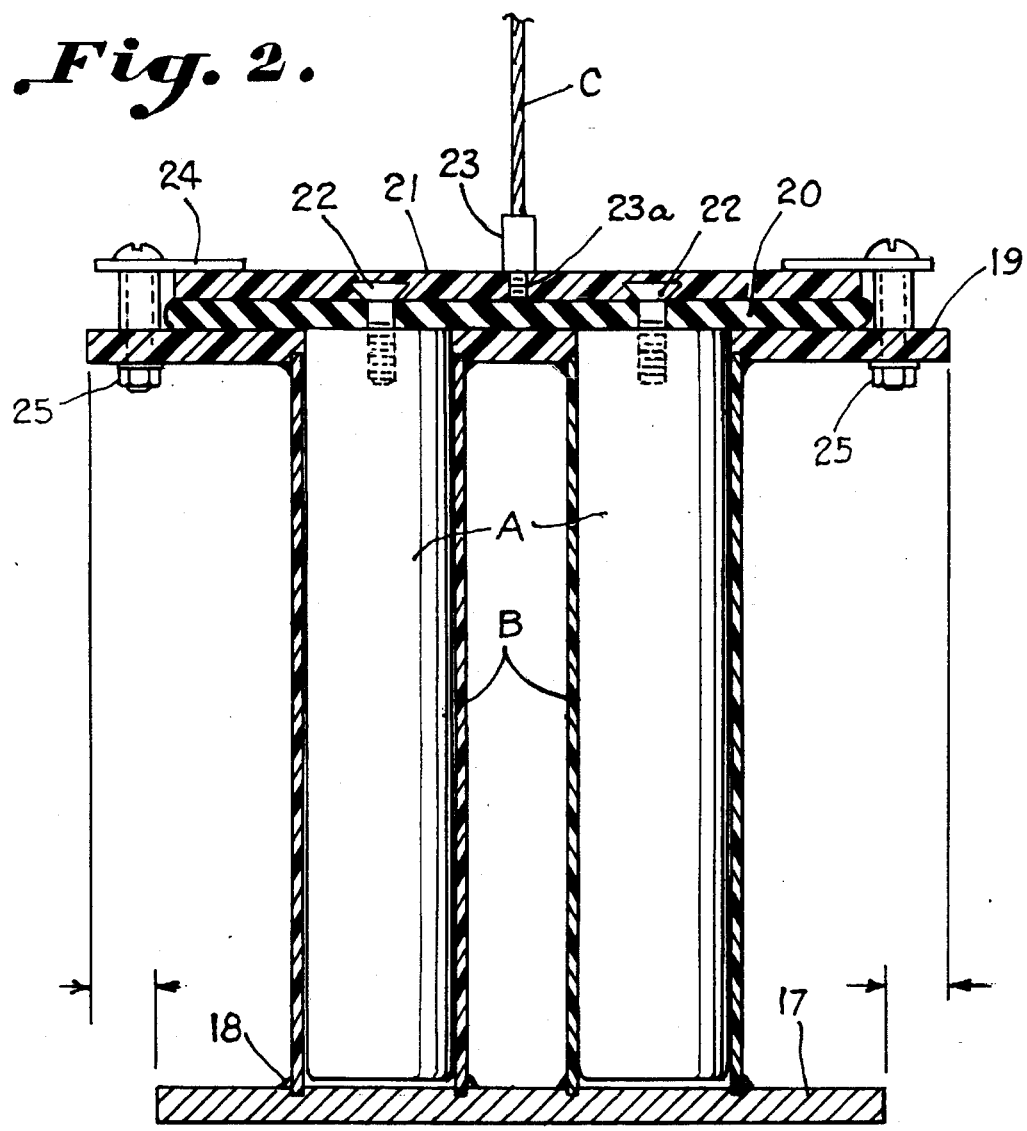
Fig. 2.
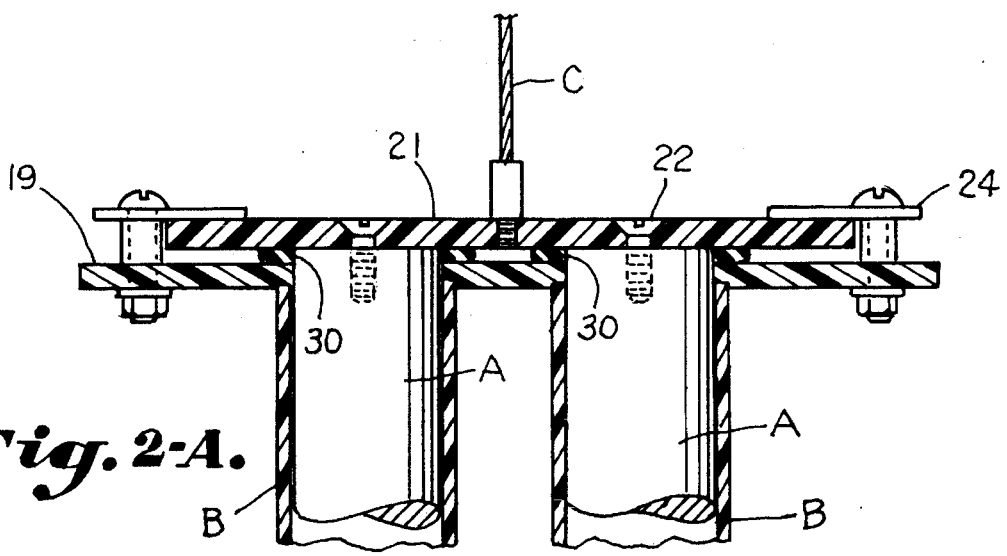
Fig. 2-A.

METHOD AND APPARATUS FOR REMOVING FERROUS PARTICLES FROM COOLANT FLUID DURING MACHINING

This application is a Continuation-in-Part of application Ser. No. 08/034,937, filed Mar. 17, 1993 now abandoned entitled METHOD OF REMOVING METAL PARTICLES FROM COOLANT FLUID.

BACKGROUND OF THE INVENTION

This invention relates to the extraction of metallic, magnetic particles from a liquid coolant utilized in a machining operation.

Ferrous magnetic particles suspended in flowing coolant fluid are of such size as to interfere with the porosity of commonly used grinding wheels and the like causing them to glaze over. When the grinding wheels become glazed over, it then becomes necessary to cutoff the surface which has been glazed before it can be used again. This requires the use of a diamond cutting tool and it causes the grinding wheel to rapidly wear out. In the case of carbide tool tips, used for example on a lathe, the small particles of ferrous metal get caught between the work and the tool causing the tool to become dull by abrasion and wear out quickly causing a necessity for sharpening or reshaping the tool.

Moreover, when the ferrous particles remain in the coolant fluid, rusting or oxidation occurs releasing hydrogen lowering the pH causing the coolant fluid to turn rancid causing bacteria to grow which when coming in contact with human flesh can cause dermatitis or other skin infections. Such makes disposal of the contaminated coolant fluid expensive and hazardous to the sewage systems. By utilization of soda ash it is possible to raise the pH but such chemical additions are expensive and alter the chemical structure of the expensive coolant fluid so that it does not work as effectively and has to be replaced.

Efforts to remove ferrous metal particles from coolant fluid used in machine tools include what is known as the Hydromation process which utilizes suction and paper filters. The particles which cause the problem dealt with by the apparatus and method of this invention are those as may pass through the filters utilized as in the Hydromation process and are so small as to float in the aqueous coolant fluid during use. The larger particles are removed as well as the smaller particles by the apparatus and process of the present invention. The smaller particles may, for example, range in size from about 1–5 Microns.

It is common practice to utilize magnetic devices for removing tramp metal in grain or feed such as illustrated in U.S. Pat. No. 4,457,838. Other applications of magnetic devices to remove magnetic material include magnetic traps disposed in flow lines where non-metallic covers are provided for the traps having depending open ended tubes into which the magnets are inserted for partial shielding from magnetic particles. Such devices are illustrated in U.S. Pat. No. 5,043,063. U.S. Pat. Nos. 2,789,655 and 4,333,825 further illustrate the state of the art.

It would be desirable to remove small or microscopic particles from coolant after the larger pieces of magnetic material are removed by conventional means such as Hydromation or centrifugal separators or all the particles may be removed at one time by utilizing the apparatus and method of the present invention.

SUMMARY OF THE INVENTION

Apparatus useful for carrying out the method of the invention is portable and submersible in coolant liquids in use in the machining apparatus. Such apparatus is preferably made from non-corrosive polypropylene, polyethylene and the like and when submersed in oil, acid, alkali or synthetic liquids is non-corrosive.

The apparatus and method removes harmful metal particles, which are magnetic, from machine tool coolants. The particles which are removed are abrasive if not removed, cause excessive wear on metal pump parts, and on cutting tools. They also cause the plugging of grinding wheels reducing their efficiency dramatically. As noted, the contaminated coolant fluid may become a health risk for the machine operators by causing dermatitis.

The apparatus includes bar magnets which are covered by tubes constructed of non-magnetic material. These non-magnetic tubes shield the magnets and prevent the particles which are suspended in the liquid from adhering directly to the magnets with consequent difficulty in removing them so as to discard the particles. It is important that the apparatus be sealed to prevent entry of coolant fluid with adherence of ferrous metal particles directly to the magnets.

The magnetic apparatus used in carrying out the method is easily stripped of the magnetic particles after removal of apparatus from the coolant. The magnets are then pulled from the non-magnetic tubing. When the magnetic field is removed the iron particles fall off the tubing or are easily wiped off. The magnets are then returned to the tubing and the apparatus is once again placed into liquid to again extract magnetic particles.

It is important that the apparatus be both submersible and waterproof. To this end the plastic tubular members are closed on one end by a base closure member while the other end is sealed between a frame member and a support which acts as a skimmer plate.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 2 is a transverse sectional elevation, at an enlarged scale, of suitable magnetic apparatus illustrated in FIG. 1 including sealing means for precluding the entry of liquid inside the tubes;

FIG. 2-A is a transverse sectional elevation illustrating a modified form of the invention wherein a sealing means is provided in the form of spaced O-rings.

DESCRIPTION OF THE PREFERRED EMBODIMENT

The drawings illustrate a preferred embodiment of apparatus for carrying out the method according to the invention. The method contemplates removing metallic particles of magnetic material from a coolant fluid used to facilitate machining away of particles from a workpiece. The method includes the steps of placing elongated bar magnets A in elongated covers or tubes B constructed of a plastic non-magnetic material shielding the elongated magnets preventing direct attachment of metallic particles thereto but causing the metallic particles to be positioned on an outer surface of the cover opposite the elongated magnet. Positioning the elongated magnets in the elongated covers in the coolant fluid attracting metallic particles from the coolant fluid toward the magnet may be accomplished as by suspending the assembly thereof by a line C into the collected coolant fluid. Then the elongated magnets, the cover and the metallic particles positioned thereon are removed from the coolant fluid. Thereafter, the elongated magnets are removed from the covers causing the metallic particles to be dislodged from the outer surface of the cover for removal after their release from the magnetic field. It is important that the assembly be liquid proof so that the coolant fluid does not enter tubes which are closed on one end by the base closure member 17 and sealed on the other end by the resilient or gasket compressible cover member 20 or by the O-rings 30.

The method may include the step of immersing, partially or fully submerging, and moving the elongated magnet and the cover about in a pool of circulating coolant fluid facilitating collection of the metal particles on an outer surface of the cover preparatory to removal thereof from the coolant fluid. The assembly may thus be immersed so as to be fully or partially submerged in the circulating or flowing liquid stream.

Figure 1:
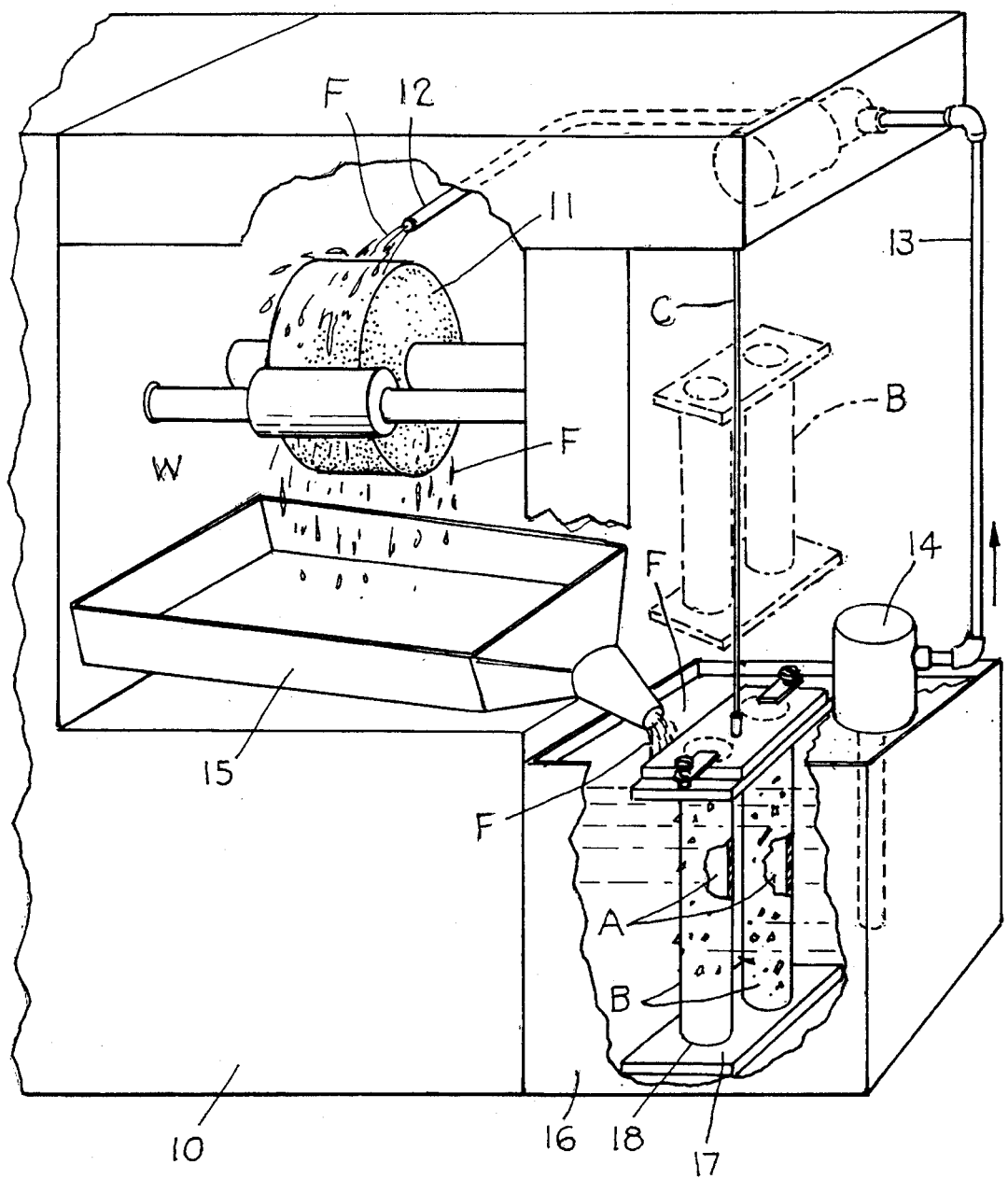
FIG. 1 is a perspective view illustrating apparatus and method in accordance with the invention as applied to a grinding machine wherein coolant fluid is collected in a reservoir from which metal particles are removed through the use of magnetic apparatus submerged in the liquid.

FIG. 1 illustrates a grinding machine having a frame 10 supporting a driven grinding wheel 11 for machining away particles from a workpiece W where coolant fluid is continuously applied by a nozzle 12. The nozzle is supplied with fluid through a line 13 which utilizes the pump 14 to supply coolant fluid F to the grinding wheel and the workpiece adjacent the point of engagement between the two.

It will be observed that the used coolant fluid F is collected in a pan 15 from which it flows by gravity into the tank or receptacle 16.

Referring to FIGS. 2, 2-A and 3, it will be noted that the bar magnets A used to facilitate the method are positioned upon a base 17 which acts as a closure member for the non-metallic covers B which are secured and sealed as by a suitable adhesive at 18 or by integral casting or molding of the members. The upper open end of the covers B are carried by a manifold 19 which has support means for receiving the open end of the covers B and which acts as a skimmer plate for removing ferrous metal particles as the magnets are withdrawn after removal from the liquid preventing their adherence to the magnets as they are withdrawn. The elongated bar magnets A are secured to a cover member 20 which is preferably deformable acting as a seal which, in turn, is secured to an insulating cover 21 as by threaded fastening members 22 embedded therein. The cover 21 is illustrated as having an eye bolt 23 which is threaded as at 23a into the cover. The line C is attached thereto to facilitate removal of the apparatus from the liquid.

The magnets and covers are assembled together as by turning the opposed latch members 24 inwardly. Any other fastening or self-fastening means such as spring clips (not shown) may be used. The latch members are carried as by positioning bolts 25 which are attached to the manifold 19.

Figure 3:
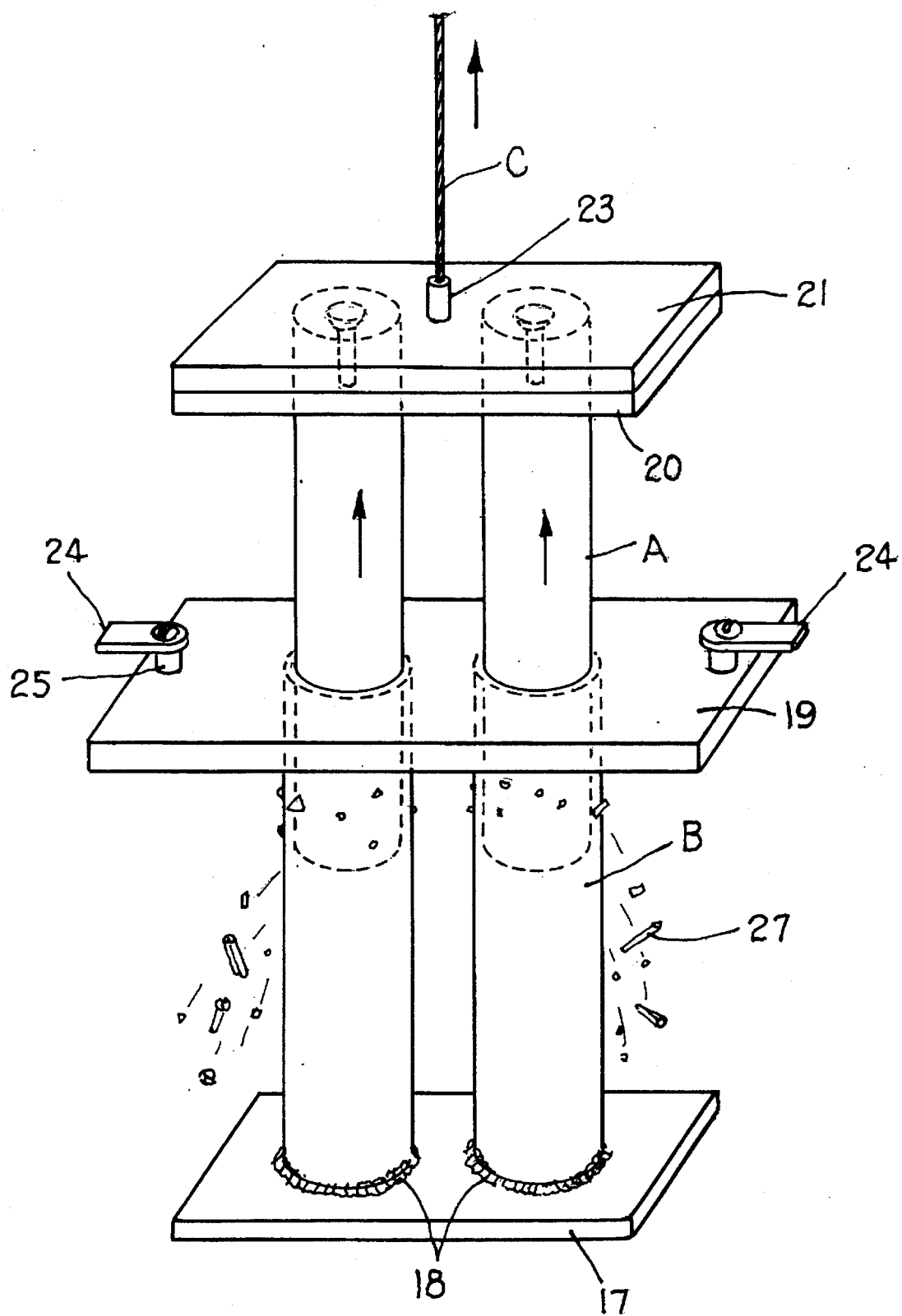
FIG. 3 is an enlarged perspective view illustrating a step of dislodging the particles from the apparatus after removal thereof from the coolant fluid through the action of a skimmer plate.

FIG. 3 illustrates removal of the metal particles after the apparatus is removed from the liquid. It is important to note that the tramp metal removed from the coolant may be chunks or microscopic particles and by turning the latch members at 24 outwardly as at 23, the elongated magnets may be removed from the covers permitting the tramp metal 27 to fall by gravity.

FIG. 2-A is a transverse sectional elevation of a modified form of the invention illustrating sealing members in the form of spaced O-rings 30 between the members 19 and 21.

It is thus seen that the apparatus for removing fine ferrous particles suspended in an aqueous coolant fluid used to facilitate the machining away of particles from a workpiece includes a plurality of elongated substantially horizontally aligned upright bar magnets A carried in fixed spaced relation to each other. A plurality of elongated plastic non-metallic cover members B preferably molded or extruded of a suitable plastic such as polyethylene, polypropylene and the like have imperforate sides and end members on one end and are open on the other end to receive the bar magnets respectively in closely fitting relation therein. A transverse frame member 19 constructed of nonmagnetic material bridges the cover members adjacent said open ends and is fixed to said cover members. The transverse frame member has openings so as not to interfere with insertion of the bar magnets into the open ends of the cover members. A liquid sealing member 20 or the O-rings 30 extends about each of the open ends of the cover members. An end closure member 21 carries the liquid sealing member. A transverse reinforcing element or base support member 17 is fixed to the covers opposite the end closure member affording rigidity and strength thereto. Thus, the cover members and the magnets contained therein are sealed against entry of coolant fluid when the apparatus is suspended therein, and the transverse frame member 19 skims away the ferrous particles avoiding adherence to the bar magnets when the magnets are withdrawn from the cover members.

Thus, a completely portable and submersible apparatus has been provided for carrying out the method of the invention for removing magnetic particles from machine coolants. The apparatus may be removed from the submerged position in fluids and is movable therein for removing the metallic particles which contaminate coolant fluids as in grinders or other machine tools.

While a preferred embodiment of the invention has been described using specific terms, such description is for illustrative purposes only, and it is to be understood that changes and variations may be made without departing from the spirit or scope of the following claims.

What is claimed is:

1. The method of removing fine ferrous particles suspended in a circulating aqueous coolant liquid used to facilitate the machining away of particles from a workpiece and collecting the particles comprising the steps of:

pumping a flowing stream of coolant to the point of contact of a machine tool and with a workpiece to control temperature and to carry away particles as may cause excessive wear to the machine tool during the machining operation;

removably sealing one end of an assembly of elongated bar magnets contained in elongated imperforate liquid tight covers each constructed of a plastic non-magnetic material shielding said elongated magnets preventing contact thereof with coolant liquid and direct attachment of said ferrous particles thereto but causing said ferrous particles to be collected on outer surface of said covers opposite said elongated magnets;

providing a base of non-magnetic material on the other end of said assembly sealing the other end of said assembly of elongated bar magnets contained in said elongated imperforate liquid tight covers;

collecting said coolant liquid in a receiving area of said machine tool from which said coolant liquid is pumped to said workpiece;

immersing said assembly in said aqueous coolant in said receiving area attracting ferrous particles from the coolant toward the magnet;

removing said assembly and the ferrous particles positioned thereon from said coolant; and thereafter removing said elongated bar magnets from said covers causing said metallic particles to be dislodged from said outer surfaces of said covers while skimming away particles as the magnets are withdrawn to avoid continued adherence thereof to the magnets;

whereby entry of said coolant liquid with adherence of said ferrous particles directly to said bar magnets is prevented.

2. The method set forth in claim 1 including the step of moving said elongated magnets and said covers about in said coolant liquid within said receiving area and supporting said elongated magnets and said covers on said base in said coolant liquid facilitating collection of said ferrous particles on an outer surface of said cover preparatory to removal thereof from said coolant liquid, said base bridging said covers.

3. Apparatus for removing fine ferrous particles suspended in an aqueous coolant fluid used to facilitate the machining away of particles from a workpiece comprising:

a plurality of elongated substantially horizontally aligned upright bar magnets carried in fixed spaced relation to each other;

a plurality of elongated plastic non-metallic cover members having imperforate sides and end members on one end and being open on the other end to receive said bar magnets respectively in closely fitting relation therein;

a transverse frame member constructed of non-magnetic material bridging said cover members adjacent said open ends and fixed to said cover members;

said transverse frame member having openings so as not to interfere with insertion of the bar magnets into the open ends of said cover members;

a liquid sealing member extending about each of said open ends of said cover members;

an end closure member carrying said liquid sealing member;

a transverse reinforcing element of non-magnetic material fixed to said covers affording rigidity and strength thereto; and non-magnetic means sealing said covers at ends opposite said end closure member against entry of coolant fluid;

whereby said cover members and the magnets contained therein are sealed against entry of coolant fluid when the apparatus is suspended therein, and whereby said transverse frame member skims away said ferrous particles avoiding their adherence to said bar magnets when the magnets are withdrawn from the cover members.

4. The structure set forth in claim 3 wherein said reinforcing element is a base support bridging and fixed to each of said cover members at an end thereof remote from said open ends supporting said cover members and magnets in sealed relation in said coolant fluid.

5. The structure set forth in claim 4 wherein said liquid sealing member includes resilient deformable O-rings carried about each open end of respective cover members when said closure member is in closed position.

* * * * *